Sept. 15, 1964    W. BOYD    3,149,046
NUCLEAR STEAM GENERATOR FOR A THERMO-ELECTRIC POWER PLANT
Filed Aug. 4, 1959    3 Sheets-Sheet 1

INVENTOR
WINNETT BOYD
BY- Smart + Biggar.
ATTORNEYS.

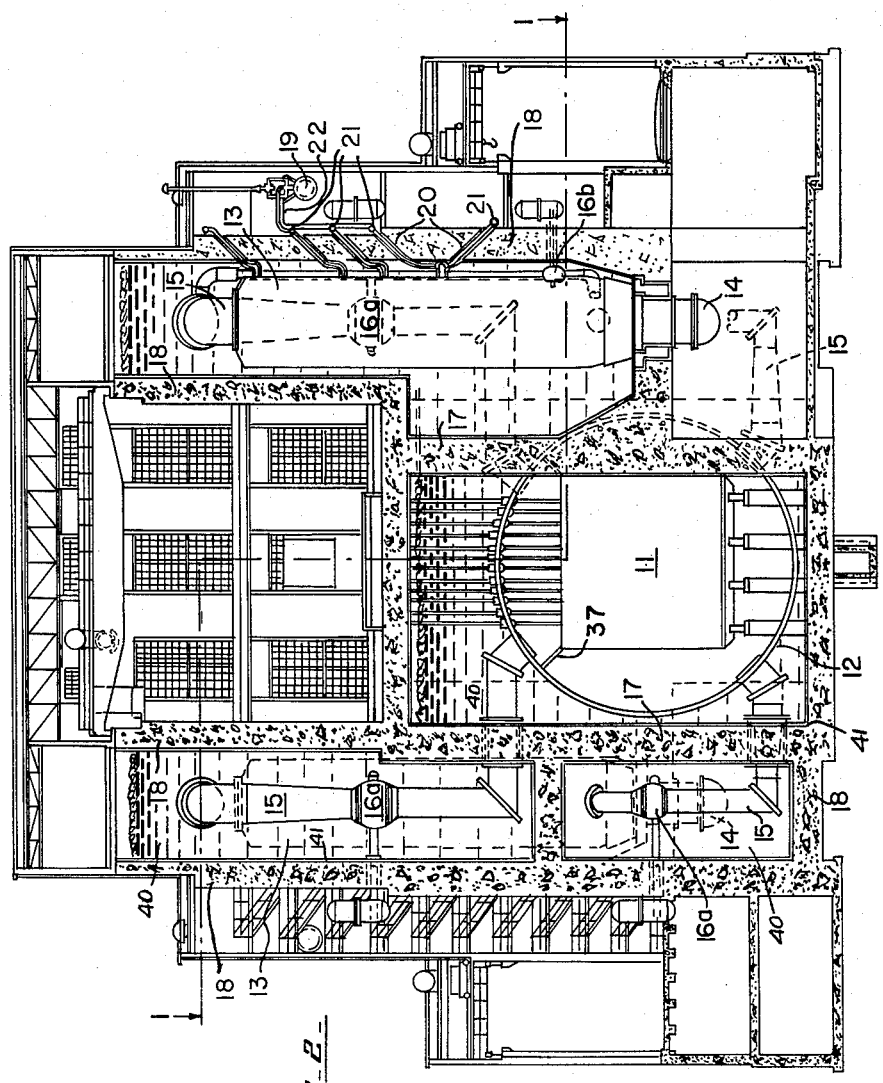

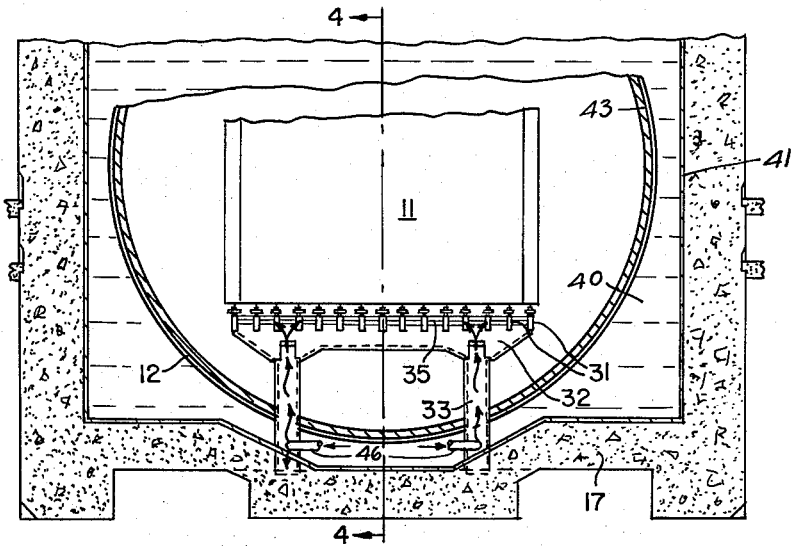
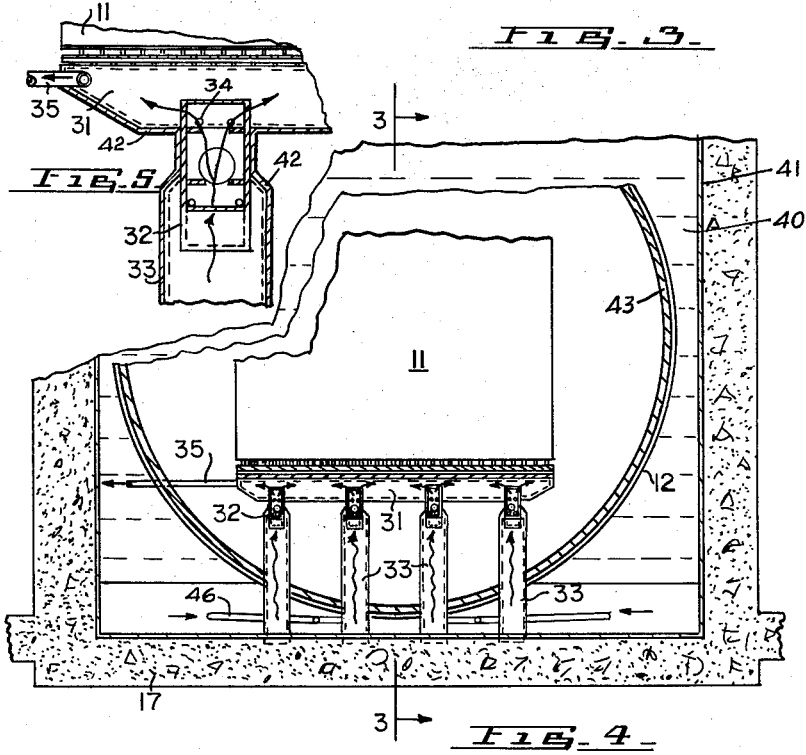

3,149,046
NUCLEAR STEAM GENERATOR FOR A THERMO-ELECTRIC POWER PLANT

Winnett Boyd, Mount Royal, Quebec, Canada, assignor, by mesne assignments, to Arthur D. Little, Inc., Cambridge, Mass., a corporation of Massachusetts
Filed Aug. 4, 1959, Ser. No. 831,602
1 Claim. (Cl. 176—53)

The invention relates to a nuclear steam generator of a type suited to the generation of thermo-electric power.

The generation of thermo-electric power by using a nuclear reactor as the primary heat source is now a practical and economic possibility. This is especially so in countries where electric power is relatively expensive such as England and many of the other European countries.

A nuclear power plant is fundamentally identical to any other thermo-electric power plant with the sole exception of the primary heat source. In a nuclear power plant this is a nuclear reactor. In a standard or regular thermo-electric power plant this is a furnace in which fossil fuel, usually coal, is burned. In a nuclear power plant a primary thermodynamic fluid, either a liquid or a gas, is used to transport the heat from the nuclear reactor to a heat exchanger where it then transfers its heat to the secondary thermodynamic fluid which is usually water and steam. Nuclear reactors are usually referred to as either liquid or gas-cooled, and these names stem from the primary thermodynamic fluids that are used. In conventional thermo-electric power plants the primary thermodynamic fluid is furnace flue gas and the secondary thermo-dynamic fluid is almost invariably water and steam.

Proposals have been made to develop nuclear power from pressurized gas-cooled, graphite moderated nuclear reactors of which the basic concept was suggested many years ago by an American named Farrington Daniels. His basic idea was the subject of a University of Chicago memorandum entitled "Suggestions for a High Temperature Pebble Pile," dated October 25, 1944, and bearing No. MUC–FD–8. While time has shown that the suggestions put forward in this memorandum required some detail modifications, it has also shown that Daniels' proposal was fundamentally sound. The present invention is concerned with a reactor of this type used in conjunction with the necessary heat transfer devices or steam raising units and the associated ancillary equipment, the whole of which may be called a nuclear steam generator.

In conventional gas-cooled nuclear power reactors of the type now known as the "Calder Hall" type, metallic sheathing is required to contain the fission products within the individual metallic fuel elements and to form the extended cooling surfaces. Consequently the maximum permissible gas temperature in such a reactor is limited both by the metallic fuel elements and their sheathing metal to a figure that is fortuitously compatible with uncooled carbon steel pressure vessels. Because of the fission product containment all of the equipment which comprises the nuclear steam generator, other than the nuclear reactor itself, does not require any shielding. This has a marked influence on the design of nuclear steam generators of this type. Also, because of the fact that the gas temperatures involved are compatible with carbon steel, the various pressure vessels and connecting gas ducts are allowed to run at or near gas temperature. This also has a marked influence on the design of these steam generators because elaborate provisions, both in the basic layout as well as in the individual components, have to be made to accommodate thermal expansions, for example, by using thermal expansion joints which required the keeping of the ducts in one plane.

The present invention provides a nuclear steam generator capable of a higher gas temperature while requiring no thermal expansion joints in the gas ducts leading to and from the reactor. A nuclear steam generator according to the invention comprises a gas-cooled solid-moderated nuclear reactor, a pressure vessel enclosing the reactor, at least one steam raising unit having an external pressure shell, at least one pressure duct connecting the pressure vessel with the steam raising unit and at least one means of circulating the gas. The pressure vessel, the steam raising unit and the duct are substantially surrounded by a cooling liquid, preferably water. The internal surfaces of the pressure vessel, of the pressure shell of the steam raising unit and of the duct are thermally insulated, preferably with material known as commercial carbon (a name given to formed and baked carbon products which have not been subsequently graphitized).

It is preferred, according to the invention, to support the reactor by a water-tight support structure comprising hollow columns superimposed by box girders which are in turn superimposed by box beams running at right angles to the girders and with their ends connected together by headers, the whole internally interconnected so that cooling fluid may flow through the entire support structure by entering the hollow columns and leaving the headers. Preferably, the support structure is covered with thermal insulating material such as commercial carbon on the surfaces which are remote from the surfaces which are in contact with the cooling liquid.

A nuclear steam generator having internally insulated components submerged in a liquid bath in accordance with the present invention has the important advantage that the temperatures of the components will approximate that of the surrounding water due to the much better heat transfer from water to metal than from gas, through insulating material, to metal. The water temperature can be maintained almost constant by the use of appropriate heat exchangers, circulating pumps, pipes, and an external cooling water supply. With approximately constant water temperature and component temperatures approximating that of the water, there will be very little thermal expansion in the components so that expansion joints are not necessary. Also, the necessity for keeping the ducts in one plane does not exist and this allows the heat exchangers to be located closer to the reactor which results in a smaller overall structure. The supports required for the reactor and other components are both simplified and reduced to a minimum because of there being little thermal expansion and because of the buoyancy provided by the water. The invention permits hydrostatic testing all of the components without subjecting them to excessive gravitational loads merely by flooding them with water both internally and externally and then raising the pressure of the internal water. During operation the water in which the components are submerged will cause any gas which may leak out of any of the components to bubble upwards to the free water surface from where it can be scavenged by a suitable ventilation system. Should a major break occur in any of the components, the reactor will be flooded with water after the gas has escaped from the circuit, thus providing a valuable safety feature.

The invention will be described further with reference to the accompanying drawings, in which FIGURE 1 is a plan view, partly in section on the line 1—1 in FIGURE 2, of a nuclear steam generator in accordance with the invention;

FIGURE 2 is an elevational view, partly in section on the line 2—2 in FIGURE 1, of the nuclear steam generator shown in FIGURE 1;

FIGURE 3 is a cross-sectional view taken on the line 3—3 in FIGURE 4, showing the support structure for the reactor;

FIGURE 4 is a cross-sectional view taken on the line 4—4 in FIGURE 3, showing the support structure for the reactor; and FIGURE 5 is a detail of connections in the support structure shown in FIGURES 3 and 4.

Figure 1:
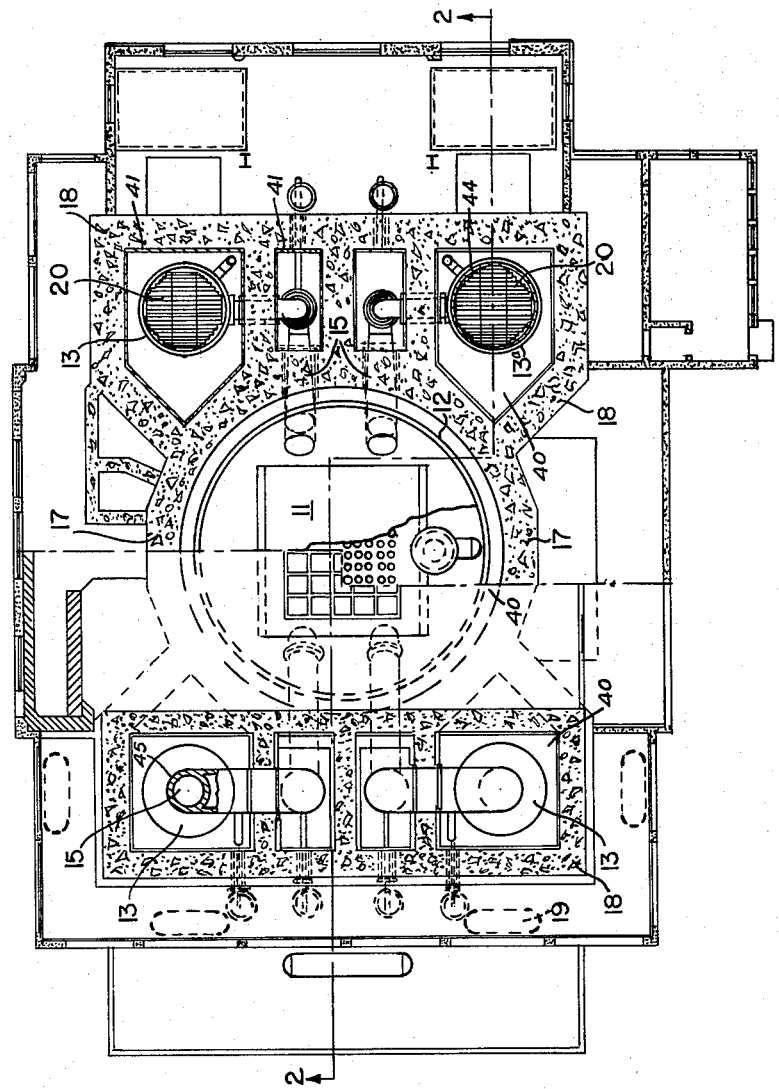

In the nuclear steam generator described below as a preferred embodiment of the invention the maximum gas temperature, which may be 1,250° F., will be beyond the safe limit for uncooled carbon steel. Also, in this steam generator the reactor fuel elements will not be metallic sheathed and thus some of the gaseous and more volatile fission products will get into the cooling gas, thereby rendering it radioactive. Thus, in this type of nuclear steam generator the entire primary cooling circuit in addition to the nuclear reactor itself must be shielded.

The basic components of the nuclear steam generator shown in FIGURES 1 and 2 are the reactor or pile itself 11, the reactor pressure vessel 12, the baffle 37 which extends between the top of the reactor 11 and the pressure vessel 12, the heat exchangers or steam raising units 13 having bailer tubing 20 within an external pressure shell 13a, the gas circulators or blowers 14, the interconnecting ducts 15, the heat exchanger isolating valves 16a and the start-up valves 16b. Because the cooling gas (or primary thermodynamic fluid) becomes radioactively contaminated with fission products, all of these pieces of equipment must be shielded by the main reactor shield 17 and the shielding 18 around the ducts and heat exchanger shells. Water, which is both a good shield and a good coolant, fills the spaces 40 defined between shields 17 and 18 and the outside of components 12, 13, 14, 15 and 16a and 16b. These components are internally insulated as with internal insulation 43, 44 and 45 to prevent too great a heat loss from the gas within these components to the water surrounding them. This insulation is preferably so-called commercial (i.e., baked ungraphitized) carbon. In the case of the pressure vessel 12 and the steam raising units 13, the internal insulation may also comprise a series of layers of steel sheet separated by gas gaps.

The internal insulation 43, 44 and 45 for the corresponding components provides the important advantage that the temperature of the components will approximate that of the surrounding water due to the much better heat transfer from water to metal than from gas, through insulating material, to metal. The water temperature can be maintained almost constant by the use of well known means such as appropriate heat exchangers, circulating pumps, pipes, and an external cooling water supply. Preferably the concrete tanks have metal lining 41 (FIGS. 1–4) forming a waterproof membrane. Steel is a preferred material for this lining.

The water shielding introduces some problems but these are minor compared with the advantages. The most serious of these problems is the added complication of the steam raising units resulting from the necessity for locating the steam drums 19 and their related mountings, etc. outside the shielding 18. This is accomplished by having all the boiler tubing 20 of the steam raising units terminate in headers 21 outside the shielding 18. The headers 21 and the steam drums 19 are then appropriately interconnected by pipes 22.

In the earlier and now conventional "Calder Hall" type of nuclear steam generators the nuclear reactor or pile itself was supported on a grid-like structure known as a "diagrid." This spanned the reactor pressure vessel near its bottom and was, in effect, a series of intersecting simple beams all welded together. Such an arrangement requires a large beam depth and so limits the volume within the pressure vessel which can be usefully occupied by the nuclear reactor.

In the high temperature nuclear steam generator which is the subject of this disclosure it is advantageous to replace the "diagrid" type of reactor support by a continuous box girder and box beam type of structure supported by a number of hollow columns. This is illustrated in FIGURES 3, 4 and 5. The structure consists of a number of box type continuous beams 31 supported, in this case, by four box type continuous girders 32 which are in turn supported by eight hollow columns 33 which pass through and are welded to the reactor pressure vessel 12. This structure is entirely welded together and internally interconnected by suitable holes 34, etc. so that cooling water (indicated in the drawings by wavy arrows) entering the bottoms of the columns 33 through duct 46 can pass upwards through them, thence through the box girders 32 and finally through the box beams 31. The ends of the box beams 31 are all connected together by headers 35 which are welded to and pass through the pressure vessel 12. These headers 35 serve to conduct the cooling water to the outside of the pressure vessel.

The box beams 31 and box girders 32 are suitably braced internally to withstand an external pressure. Also, along with columns 33 they are externally insulated such as by insulation 42 (FIG. 5) to reduce the transfer of heat from the gas within the pressure vessel 12 to the cooling water within the beams 31, the girders 32, and the columns 33.

This type of reactor support structure has the advantage that with the pile support structure maintained at the same temperature as the reactor pressure vessel because they are both water cooled, there is practically no differential thermal expansion between them. The use of continuous beams and girders rather than simple beams as in the "diagrid" type of support structure, results in the vertical height occupied by the support structure being reduced to a minimum.

What I claim as my invention is:

A gas-cooled, solid moderated nuclear reactor assembly comprising:

(a) a nuclear reactor;

(b) a pressure vessel enclosing said reactor;

(c) steam raising means;

(d) valve-controlled duct providing communication between the interior of said pressure vessel and said steam-raising means;

(e) a cooling gas within said pressure vessel, said duct and said steam-raising means and surrounding said reactor;

(f) means for circulating said cooling gas through said duct between said pressure vessel and said steam-raising means;

(g) a closed liquid container surrounding and spaced away from said pressure vessel, said steam-raising means, said duct, and said circulating means;

(h) a cooling liquid within said container and filling the space between it and said pressure vessel, said steam-raising means, said duct, and said circulating means;

(i) internal thermal insulation on those walls of said pressure vessel, said steam-raising means, said duct, and said circulating means which are in contact with said cooling liquid;

(j) all of said walls being fluid-tight against passage therethrough of said cooling liquid and said cooling gas;

(k) a support for said nuclear reactor mounted upon the bottom of said container and extending upwardly through and in fluid-tight relation with said pressure vessel;

(l) said support consisting of a plurality of hollow members arranged for circulation therethrough of said cooling liquid in out-of-contact heat exchange relationship with said nuclear reactor and with said cooling gas; and (m) openings in the walls of said members below and outside of said pressure vessel and arranged for the passage of said cooling liquid between said container and the interior of said members.

References Cited in the file of this patent

UNITED STATES PATENTS

| | | | |
|---|---|---|---|
| 2,810,689 | Wigner et al. | Oct. 2, | 1957 |
| 2,837,477 | Fermi et al. | June 3, | 1958 |
| 2,863,815 | Moore et al. | Dec. 9, | 1958 |
| 2,868,708 | Vernon | Jan. 13, | 1959 |

FOREIGN PATENTS

| | | | |
|---|---|---|---|
| 789,022 | Great Britain | Jan. 15, | 1958 |

OTHER REFERENCES

Research Reactors (TID–5275), October 1955, p. 411.
15 MW Gas-Cooled Closed-Cycle Reactor Power System, Study (FICO–101), July 1958, pp. 285, 286, 291 and 303.

Mitchell et al.: Proceedings of the Second United Nations International Conference on the Peaceful Uses of Atomic Energy, vol. 9 (Nuclear Power Plants, Part 2), pp. 310–315.

Army Package Power Reactor (APPR–1), Operating Manual and Inspection and Service Manual (APAE–30), February 1958, pp. 11, 21, and 58–63.

Proceedings of the International Conference on the Peaceful Uses of Atomic Energy, Geneva, August 8–20, 1955, pp. 212, 213, United Nations, New York (1956); article by Simpson et al.

Atomic Energy Commission Document TID–7564, Gas Cooled Power Reactors, December 1958, pp. 69 and 141.